United States Patent [19]

Huffman

[11] 4,091,688

[45] May 30, 1978

[54] EASILY ASSEMBLED AND DISASSEMBLED PLANETARY GEAR ASSEMBLY

[75] Inventor: Roger B. Huffman, Chanhassen, Minn.

[73] Assignee: Dana Corporation, Toledo, Ohio

[21] Appl. No.: 719,815

[22] Filed: Sep. 1, 1976

[51] Int. Cl.² .................. F16H 3/44; F16H 35/00; F16H 57/10

[52] U.S. Cl. .......................... 74/785; 74/391; 74/801; 180/43 B

[58] Field of Search .......................... 74/391, 785, 801; 180/43 B

[56] References Cited

U.S. PATENT DOCUMENTS

| 2,858,897 | 11/1958 | Sibley | 180/43 B |
| 3,295,624 | 1/1967 | Lee et al. | 180/43 B |
| 3,469,647 | 9/1969 | Brown | 180/43 B |
| 4,020,716 | 5/1977 | Tóth et al. | 74/801 X |

FOREIGN PATENT DOCUMENTS

| 674,757 | 11/1963 | Canada | 74/785 |

*Primary Examiner*—Samuel Scott
*Assistant Examiner*—Carl F. Pietruszka
*Attorney, Agent, or Firm*—Warren A. Sturm; Hugh D. Jaeger

[57] ABSTRACT

A planetary gear assembly which includes an axle housing for rotatably carrying an axle shaft with a sun gear at its outer end, a spindle gear removably mounted to the axle housing, and a hub rotatably mounted to the spindle gear, the axle housing, spindle gear and hub having axial bores permitting the passage therethrough of an axle shaft. The spindle gear has a recessed interior with an inner surface provided with integrally formed gear teeth, and the hub includes a plurality of planet gears which are disposed between the sun gear of the axle shaft and the ring gear of the spindle gear. The spindle gear and hub are so constructed and arranged as to permit the axle shaft and sun gear to be withdrawn outwardly through the hub, and to permit the hub and spindle gear assembly to be removed from the axle housing as a unit.

7 Claims, 3 Drawing Figures

4,091,688

EASILY ASSEMBLED AND DISASSEMBLED PLANETARY GEAR ASSEMBLY

BACKGROUND OF THE INVENTION

The present invention relates to a planetary transmission including a novel planetary gear assembly.

Planetary transmissions, disposed at the ends of drive axles, are generally known and have commonly been used for heavy-duty vehicles such as trucks and construction machinery. They are advantageous for such heavy-duty use because the minimize the torque which must be transmitted by the differentials and axle shafts of such vehicles.

Such planetary transmissions in the past have added considerably to the expense of heavy-duty vehicles, and have been difficult to repair or replace. As a result, planetary transmission of the type described have been employed generally only on more expensive lines of trucks and other vehicles. Because of the advantages which may be obtained from planetary transmission at the ends of drive axles, it would be desirable to provide a relatively inexpensive plentary gear assembly which can be easily assembled and disassembled from the vehicle and which further would permit the drive axle shaft to be removed from the transmissin without requiring disassembly of the transmission.

SUMMARY OF THE INVENTION

The present invention provides a planetary gear assembly for a transmission which can be easily assembled and disassembled, which is relatively inexpensive to fabricate, and from which the drive axle shaft may be removed with ease. The planetary transmission includes an axle shaft with a sun gear integral with or mounted to the shaft at its outer end for rotation with the shaft. The gear assembly includes an axle housing rotatably carrying the axle shaft and unitary spindle gear body which is rigidly but removably mounted to the axle housing and which extends axially outwardly of the housing in circumferential relationship to the axle shaft. The spindle gear is provided with a recessed interior with an inner surface having formed therein a circumferential ring of inwardly projecting teeth surrounding but spaced from the sun gear. A hub for carrying a wheel and rim assembly for tire mounting or other torque-transmitting device (e.g., a chain sprocket) is rotatably mounted to and extends outwardly of the spindle gear, the hub carrying a plurality of spaced, rotatable planet gears which are disposed between the toothed ring of the spindle gear and the sun gear. The hub is provided with a central bore or aperture aligned with the axis of the axle shaft and of sufficient size to permit the axial shaft and sun gear as a unit to be pulled outwardly therefrom. The hub is provided also with a removable cap covering the hub aperture and including retaining means restraining outward axial movement of the axle shaft.

The axle shaft and sun gear may thus be simply removed through the hub aperture for repair or replacement, and the spindle gear and hub may be readily removed as a unit from the axle housing as may be required for repair or replacement.

DETAILED DESCRIPTION OF THE PREFERRED EMBODIMENT

Figure 1:
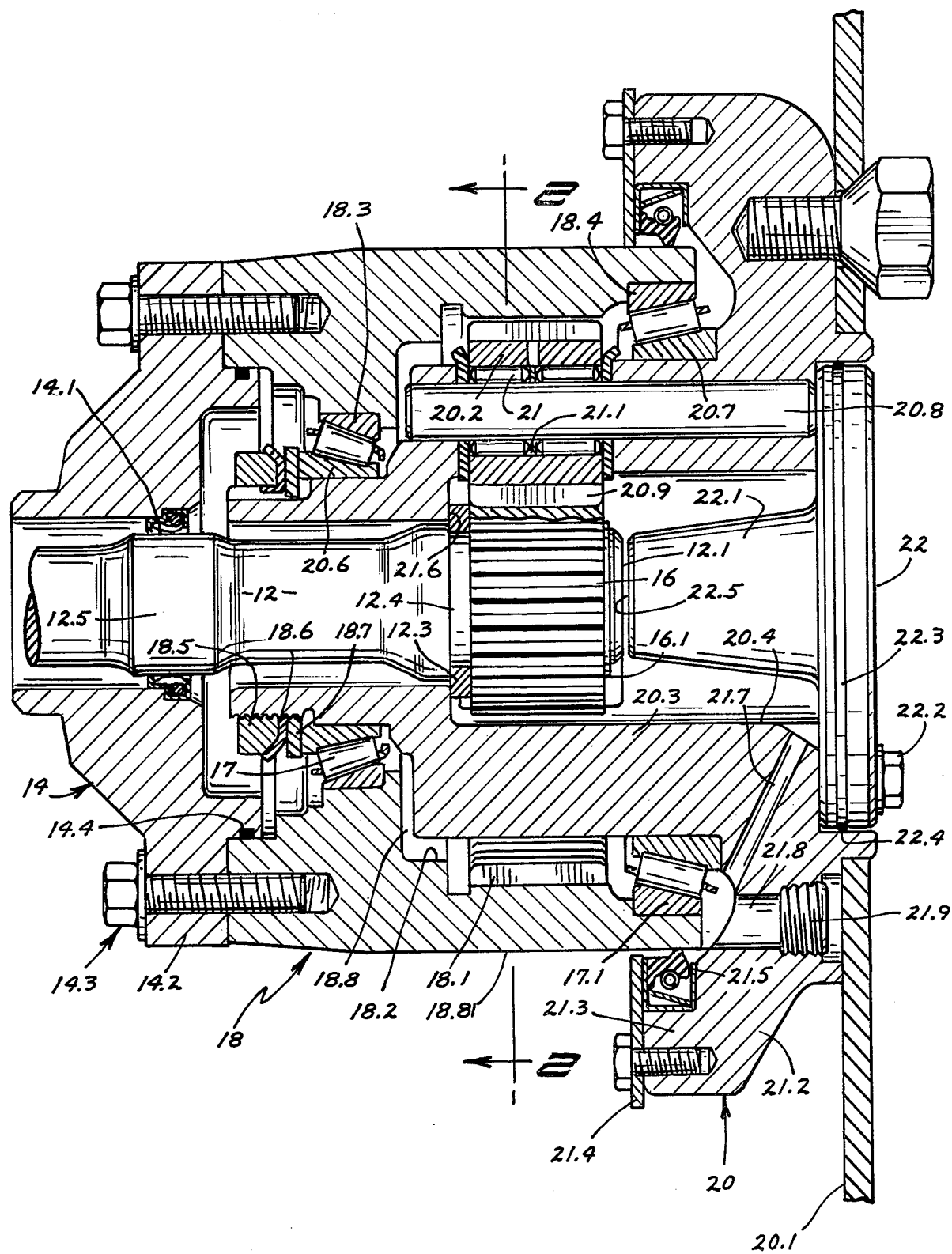
FIG. 1 is a broken away view in partial cross section showing a gear assembly of the invention.
Figure 2:
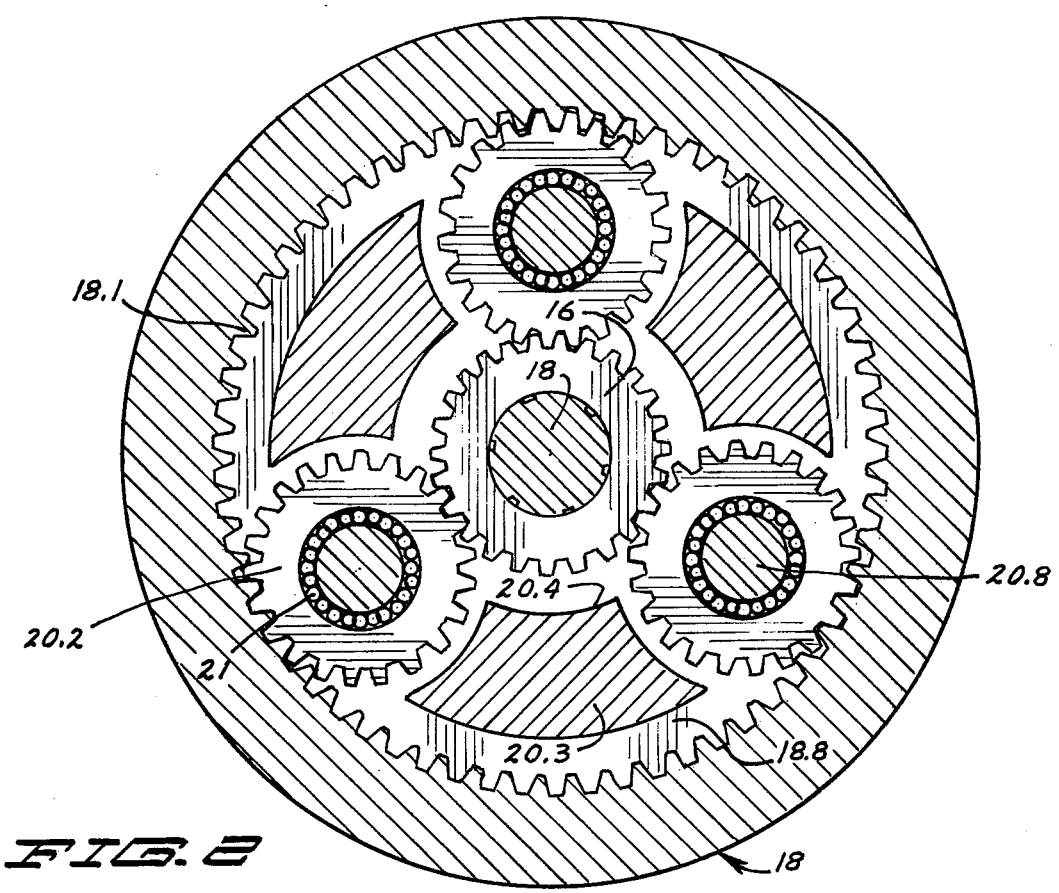
FIG. 2 is a cross-sectional view taken along line 2—2 of FIG. 1.

FIG. 1 shows the outer end of an axle shaft 12 mounted for rotation in an axle housing 14, the latter being provided with an annular lubrication seal 14.1 in contact with the axle shaft. Mounted, as by splines, to the outer end of the axle shaft is a sun gear 16 which is restrained from escaping from the axle by means of a snap ring retainer 16.1, or the axle shaft and sun gear may be provided as an integral unit. A spindle gear, shown generally as 18, is mounted at its inner end to the axle housing 14 and has a recessed interior provided with a toothed ring gear 18.1 Rotatably mounted to the spindle gear 18 is a hub, designated generally as 20, the hub bearing, for example, a wheel and rim assembly of which a portion is shown at 20.1 in FIG. 1. The hub is provided with a plurality of planet gears 20.2 meshing with the ring gear 18.1 and the sun gear 16 to cause the hub to rotate about the spindle gear in response to rotation of the axle shaft 12. A cap 22 is removably mounted to the hub 20, and has an inwardly projecting portion 22.1 restraining outward axial movement of the axle shaft.

Referring again to FIG. 1, the spindle gear 18 is provided with a recessed interior which is generally of greater diameter adjacent its outer end than its inner end, and which has an interior surface 18.2. The ring gear 18.1 is formed integrally on the interior surface 18.2, and extends circumferentially about the latter interior surface. At its inner end, the spindle gear 18 is coaxially and removably mounted to the axle housing 14 by means of mounting 14.3 Sealing means, such as an O-ring 14.4 may be employed to seal the axle housing to the spindle gear. It will be noted that the axle housing and the spindle gear are themselves free from obstructions preventing their axial disassembly upon removal of the bolts 14.3. Inner and outer roller bearing cups, designated 18.3, 18.4, are provided at the interior surface 18.2 of the spindle gear adjacent its inner and outer ends, respectively.

The hub 20, as shown best in FIG. 1, has an interior portion 20.3 having a central bore 20.4, the interior portion being received coaxially between the outer end of the axle shaft 12 and the spindle gear 18. The inner end 20.5 of the hub is reduced diameter, and approaches the axle housing 14. The inner hub end section 20.5 is provided with a roller bearing cone 20.6 in opposition to the roller bearing cup 18.3 of the spindle gear, and tapered roller bearings 17 are mounted in this annular space between the roller bearing cups in the usual manner to afford a smooth rotational coupling between the inner end of the hub and the spindle gear. Similarly, the interior portion 20.3 of the hub adjacent the outer end of the spindle gear is provided with a roller bearing cone 20.7 in opposition to the roller bearing cup 18.4 of the spindle gear, and a plurality of tapered roller bearings 17.1 are disposed in the annular space between the latter roller bearing cups. As will be evident from FIG. 1, the roller bearings 17 are spaced axially inwardly from the roller bearings 17.1, whereby the hub is rotatably mounted at both its inner and outer ends to the spindle gear to maintain coaxial alignment of the hub and spindle gear during operation, as will be more fully described below.

Extending inwardly from the outer end of the hub, and parallel to the axis of the axle shaft, and a plurality of pins 20.5 each carrying a planet gear 20.2 having teeth 20.9 meshing with the teeth of the sun gear 16 and with the teeth of the toothed ring 18.1 formed integrally on the inner surface of the spindle gear 18. The planet gears are mounted to the pins 20.8 by means of circumferential rings of axially extending needle bearing 21. As depicted in FIG. 1, two coaxial rings of needle bearings are employed, separated by a central bearing spacer 21.2. Desirably, three planet gears, equiangular spaced about the circumference of the toothed ring 18.1 of the spindle gear, are employed.

To maintain the roller bearing cone 20.6 in a snug, bearing-contracting relationship with the roller bearing 17, a keyed washer 18.7 and a lock washer 18.6 are fitted over the outer periphery of the inner end 20.5 of the hub, and are held in place by a lock nut 18.5. As will be evident from FIG. 1, tightening of the lock nut 18.5 insures snug seating not only of the bearings 17, but also of the bearings 17.1 at the outer end of the hub. It will be understood that the tapered roller bearings 17, 17.1 and their supporting cups may be replaced by ball bearings and races or other antifriction bearings.

The outer end of the hub protrudes outwardly from the outer end of the spindle gear 18, and is provided with an annular portion 21.2 of increased diameter. The latter portion has an annular lip 21.3 which extends rearwardly at a short distance along but spaced from the outer surface 18.81 of the spindle gear. The lip 21.3, at its inner end, is provided with an annular plate 21.4 forming with the lip and the adjacent surface 18.8 of the spindle gear with an annular recess within which is mounted a ring seal 21.5.

The outer end of the axial bore formed in the hub may be closed by a cap 22, which is removably secured to the exterior of the hub by means of bolts 22.2. The cap is provided with a peripheral groove 22.3 within which is seated an O-ring or other annular seal 22.4 providing a lubricant seal between the cap and the hub. A frustoconical projection 22.1 extends inwardly from the inner surface of the cap, and terminates in a generally flat surface 22.5 which is generally parallel to and is closely spaced from the flat, transverse end 12.1 of the axle shaft, the cap serving to prevent the axle shaft from moving axially outwardly when the cap is in place. It will be noted that the axle shaft is also provided with an annular spacer 12.3 which seats immediately inwardly of the sun gear 16, the spacer 12.3 also engaging an inner shoulder 21.6 of the hub. In position, the spacer 12.3 maintains the sun gear in place fully engaged axially with the planet gears 20.2.

As will now be understood, the interior surface 18.2 of the spindle gear is spaced from the outer surface of the interior portion 20.3 of the hub which is received within the spindle gear; the space 18.8 between the surfaces provides a lubricant enclosure which is sealed at its outer end by the seal ring 21.5 and at its inner end by the annular lubricating seal 14.1. Lubricant within the space 18.8 serves to lubricate the tapered roller bearings 17, 17.1 and planet gears and their supporting needle bearings. A generally annular space is provided between the inner walls 20.4 of the hub and the inner projection 22.1 of the cap, which space serves as a lubricant reservoir and communicates, via duct 21.7 formed in the hub body, with the space 18.8 between the hub and the spindle gear. The exterior portion 21.2 of the hub also includes an outwardly extending duct 21.8 communicating the space 18.8 with the exterior of the hub, the duct 21.8 being closed by a drain plug 21.9 and serving as an access port for adding lubricant to, or draining it from, the interior of the gear assembly.

Figure 3:
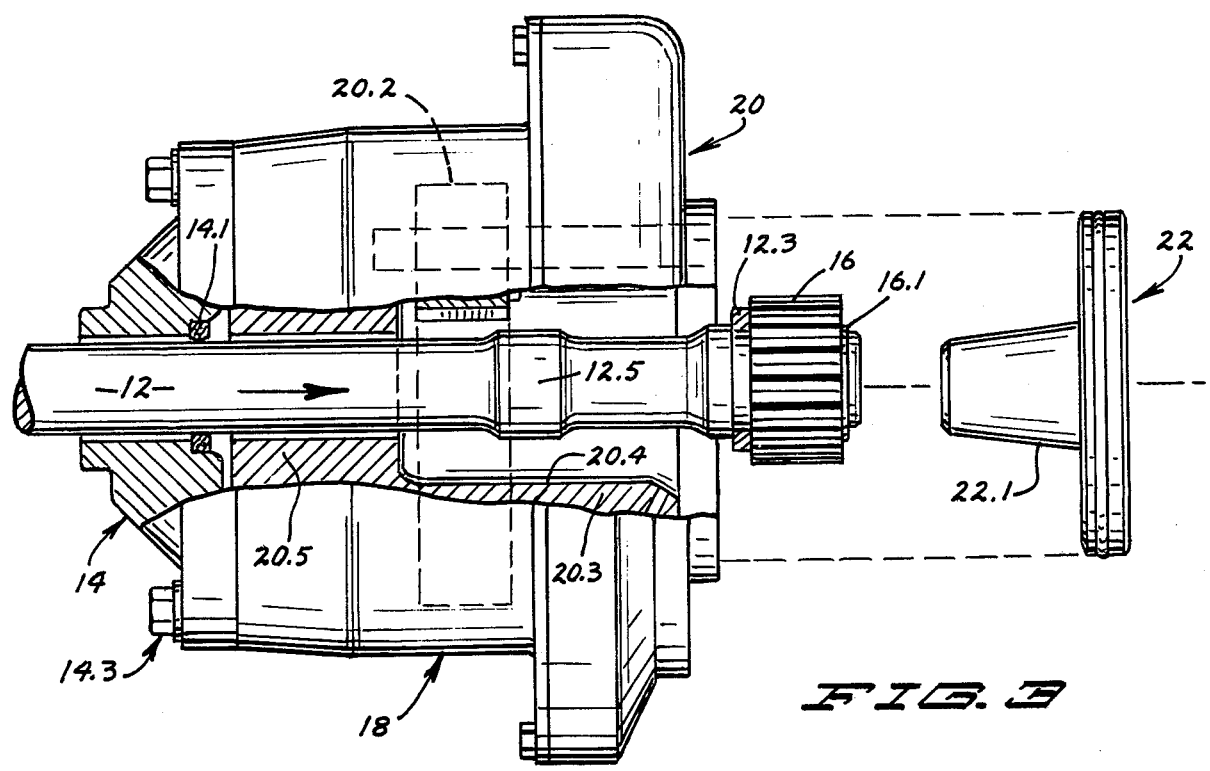
FIG. 3 is a broken away, exploded, largely diagrammatic view similar to FIG. 1 and illustrating removal of parts.

The interior 20.4 of the hub is of sufficient diameter to permit the axle shaft 12 and its attached sun gear 16 to be drawn axially outwardly from the hub upon removal of the cap 22, the sun gear thus disengaging the teeth of the planet gears 20.2. In this manner, the axle shaft and its sun gear can be withdrawn from the hub while the latter remains attached, through the spindle gear, to the axle housing 14. It will be noted that the annular lubricating seal 14.1 between the axle shaft and the axle housing has an easily flexed, inner surface permitting the slightly enlarged axle shaft section 12.5 normally in contact with the seal to be easily withdrawn from and replaced within the seal. FIG. 3 depicts, in schematic form, the axial withdrawal of the axle shaft and attached sun gear from the planetary gear assembly.

It will now also be understood that the hub and spindle gear may be unbolted and removed, as a unit, from the axle housing 14 for replacement or repair, the axle housing being free from obstructions preventing the hub-spindle gear unit from being axially drawn therefrom. The hub-spindle gear unit will normally be unbolted and withdrawn from the axle housing after the axle shaft and sun gear have been removed.

Following removal of the hub-spindle gear unit from the axle housing, the unit may be easily disassembled by removal of the lock nut 18.5, washers 18.6 and 18.7, and the roller bearing assembly including the bearing cone 20.6 and roller bearings 17. Such disconnection permits the hub to be pulled axially outwardly from the spindle gear. It will be evident that the hub-spindle gear unit can be easily reassembled and bolted to the axle housing, and the axle shaft and sun gear can be readily reinserted.

Thus, manifestly, I have provided a planetary gear assembly for a transmission which is capable of being easily and readily assembled and disassembled and which is of simple but uniquely inexpensive construction. The axle shaft with attached sun gear can be easily drawn from the transmission by removal of the cap 22, and the hub and spindle gear can be readily removed as a unit from the axle housing.

While I have described a preferred embodiment of the present invention, it should be understood that various changes, adaptations, and modifications may be made therein without departing from the spirit of the invention and the scope of the appended claims.

What is claimed is:

1. In a planetary transmission including an axle shaft with a sun gear at its outer end, a planetary gear assembly comprising a stationary axle housing for rotatably carrying the axle shaft; a unitary spindle gear body removably mounted to and extending axially outwardly of the axle housing in circumferential relationship to the axle shaft and having a recessed interior with an inner surface having formed therein a toothed ring surrounding but spaced radially from the sun gear; a hub rotatably mounted to and extending axially outwardly of the spindle gear, the hub carrying a plurality of spaced, rotatable planet gears disposed between the toothed ring of the spindle gear and the sun gear and meshing therewith, the hub having a aperture coaxial with the spindle gear and of sufficient size to permit axial outward removal of the sun gear and axle shaft therethrough; the hub including an inwardly extending annular portion disposed between the axle shaft and the spindle gear, a first set of bearings axially inward of said ring rotatably mounting the annular portion of the hub adjacent its inner end to the spindle gear bearing retaining means retaining the first set of bearings between the hub and the spindle and permitting separation of the same, and a second set of bearings axially outward of said ring rotatably mounting the hub to the spindle gear adjacent the outer end of the latter, the first and second sets of bearings being spaced axially on the inwardly extending annular portion and the outer end of the hub to maintain coaxial rotation of the hub with respect to the spindle gear and balance forces acting on the first and second sets of bearings; and a removal cap covering the hub aperture providing ease of accessibility to the sun gear, the spindle, and the hub and including means restraining outward axial movement of the axle shaft, whereby the axle shaft and sun gear may be simply removed through the hub aperture, and whereby the spindle gear and hub may thereafter be readily removed, as a unit, from the axle housing.

2. The planetary gear assembly of claim 1 including seal means providing a lubricant-retaining enclosure for lubricating the sun and planet gears and the integral toothed ring of the spindle gear.

3. The planetary gear assembly of claim 1 wherein the hub inclues a plurality of axially inwardly extending pins carrying the planet gears, and wherein the hub is free of obstructions preventing free outward movement of the axle shaft and sun gear therefrom.

4. The planetary gear assembly of claim 1 wherein the restraining means comprises a projection extending axially inwardly of the cap and terminating closely adjacent the outer end of the axle shaft.

5. The planetary gear assembly of claim 1 wherein the body of the spindle gear is free from obstructions preventing removal therefrom of the inwardly extending annular portion of the hub.

6. In a planetary transmission including an axle shaft with a sun gear at its outer end, a planetary gear assembly comprising:

an axle housing for rotatably carrying the axle shaft;
a unitary spindle gear body removably mounted to, and extending axially outwardly of, the axle housing in circumferential relationship to the axle shaft and having a recessed interior with an inner surface having formed therein a ring of inwardly projecting teeth surrounding but spaced from the sun gear;
a hub rotatably mounted to and extending axially outwardly of the spindle gear, the hub having an inwardly extending annular portion disposed between the axle shaft and the spindle gear, a first set of bearings axially inward of said ring rotatably mounting the annular portion of the hub adjacent its inner end to the spindle gear bearing retaining means retaining the first set of bearings between the hub and the spindle and permitting separation of the same, a second set of bearings axially outward of said ring rotatably mounting the hub to the spindle gear adjacent the outer end of the latter, the first and second set of bearings being spaced axially on said inwardly extending annular portion and said outer end of said hub to maintain coaxial rotation of the hub with respect to the spindle gear and balance forces acting on the first and second sets of bearings, and the hub including a plurality of axially inwardly extending pins rotatably mounting planet gears disposed between the toothed ring of the spindle gear and the sun gear, and meshing with the toothed ring of the spindle gear and the sun gear, the hub having an axial bore coaxial with the spindle gear and of sufficient size to permit axial outward removal of the sun gear and axle shaft therethrough;

a seal between the spindle and the outer end of the hub and a seal between the axle housing and axle forming a sealed enclosure serving to lubricate the first and second set of bearing, the planet gears, and the plurality of axially inwardly extending pins;

the body of the spindle gear being free from obstructions preventing axially outward removal therefrom of the inwardly extending annular portion of the hub;

a cap removably mounted to exteriorly cover the hub bore, the cap including restraining means projecting inwardly of the hub bore for restraining outward axial movement of the axle shaft therefrom and for providing ease of accessibility to the sun gear, the spindle, and the hub; and whereby the axle shaft and sun gear may be simply removed through the hub bore, and whereby the spindle gear and hub may be readily removed as a unit from the axle housing.

7. A planetary transmission including an axle shaft with a sun gear at its outer end, and a planetary gear assembly, the assembly comprising:

an axle housing for rotatably carrying the axle shaft;
a unitary spindle gear body removably mounted to, and extending axially outwardly of, the axle housing in circumferential relationship to the axle shaft and having a recessed interior with an inner surface having formed therein a ring of inwardly projecting teeth surrounding but spaced from the sun gear;
a hub rotatably mounted to and extending axially outwardly of the spindle gear, the hub having an inwardly extending annular portion disposed between the axle shaft and the spindle gear, a first set of bearings axially inward of said ring rotatably mounting the annular portion of the hub adjacent its inner end to the spindle gear bearing retaining means retaining the first set of bearings between the hub and the spindle and permitting separation of the same, a second set of bearings axially outward of said ring rotatably mounting the hub to the spindle gear adjacent the outer end of the latter, the first and second sets of bearings being spaced axially on said inwardly extending annular portion and said outer end of said hub to maintain coaxial rotation of the hub with respect to the spindle gear and balance forces acting on the first and second sets of bearings, and the hub including a plurality of axially inwardly extending pins rotatably mounting planet gears disposed between the toothed ring of the spindle gear and the sun gear, the planet gears meshing with the toothed ring of the spindle gear and the sun gear, the hub having an axial bore coaxial with the spindle gear and of sufficient size to permit axial outward removal of the sun gear and the axle shaft therethrough;

the body of the spindle gear being free from obstructions preventing axially outward removal therefrom of the inwardly extending annular portion of the hub;

a cap removably mounted to exteriorly cover the hub bore, the cap including restraining means projecting inwardly of the hub bore for restraining outward axial movement of the axle shaft therefrom and for providing ease of accessibility to the sun gear, the spindle, and the hub;

seal means comprising a seal ring and an annular lubricating seal to provide a lubricant-restraining enclosure for the sun and planet gears and the integral toothed ring of the spindle gear, and;

whereby the axle shaft and sun gear may be simply removed through the hub bore, and whereby the spindle gear and the hub may be readily removed as a unit from the axle housing.

* * * * *